Jan. 25, 1955   J. A. PAGANELLI   2,700,252
POLE THREADER

Filed Oct. 27, 1952   2 Sheets-Sheet 1

James A. Paganelli
INVENTOR.

BY *[signatures]*
Attorneys

Jan. 25, 1955 J. A. PAGANELLI 2,700,252
POLE THREADER
Filed Oct. 27, 1952 2 Sheets-Sheet 2
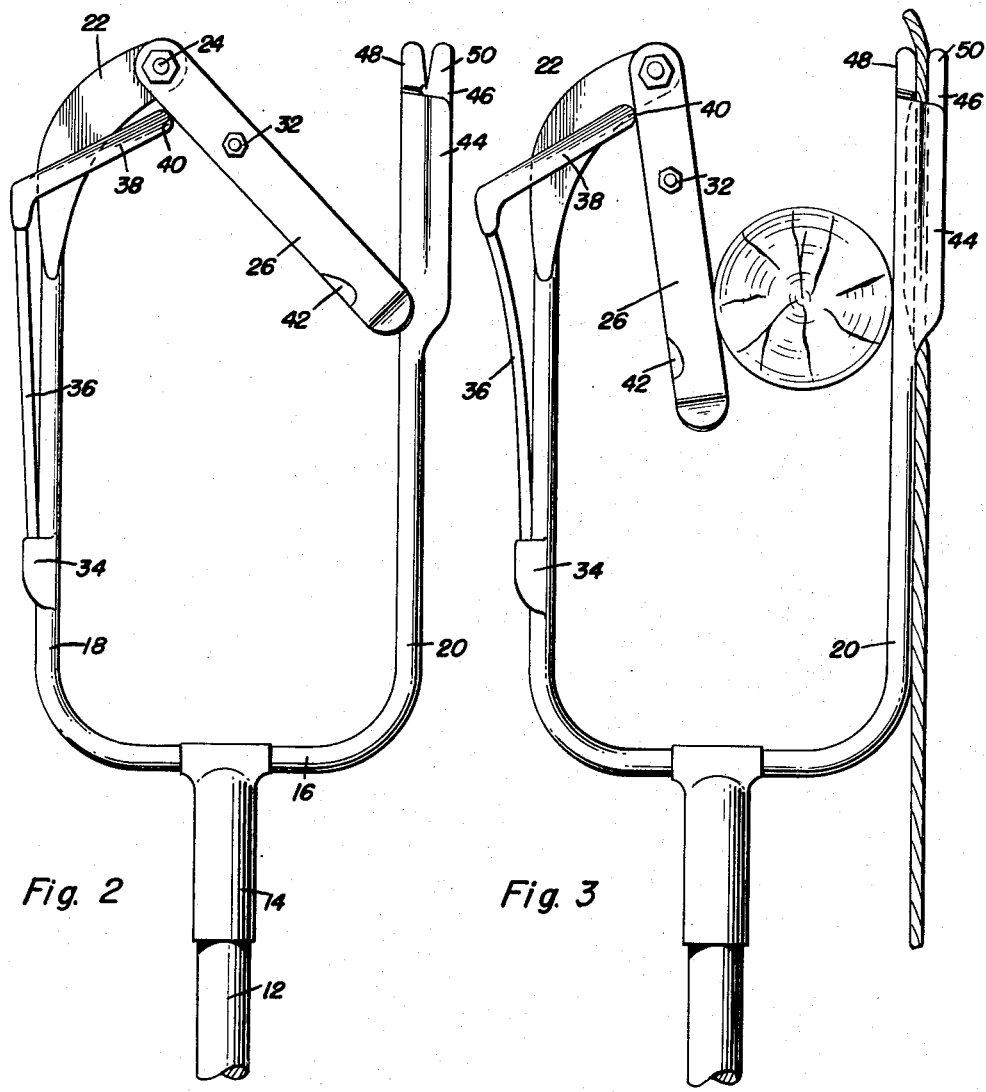
James A Paganelli
INVENTOR.

United States Patent Office 2,700,252
Patented Jan. 25, 1955

2,700,252

POLE THREADER

James A. Paganelli, Wapato, Wash.

Application October 27, 1952, Serial No. 317,073

6 Claims. (Cl. 47—1)

This invention relates to a device for threading twine or other line about the limb of a tree or like member, which device is particularly adapted for use in conjunction with the tying of fruit bearing limbs in orchards and the like.

A particular object of this invention is to eliminate the necessity of ladders so as to enable the passage of line about the limbs of fruit-bearing trees and bushes, so as to avoid bruising the fruit borne, to reduce the number of props necessary in supporting the limbs, and to reduce the time and effort necessary to properly support such limbs and branches.

Features of the invention which enable this device to perform its desired function are the pair of opposed upwardly extending arms, a first of which arm has pivotally mounted thereon spring pressed fingers which are adapted to engage a line threading means. The fingers are directed into engagement with the line threading means by a resilient rod having bifurcated end portions formed with cam surfaces which engage the fingers.

Still further objects of the invention reside in the provision of a pole threader that is strong, durable, highly efficient in operation, simple in construction and manufacture, and capable of being used for a variety of divergent purposes, while being relatively inexpensive to produce.

These, together with the various ancillary objects of the invention which will become apparent as the following description proceeds, are attained by this pole threader, a preferred embodiment of which has been illustrated, by way of example only, wherein:

Figure 2 is a side elevational view of the invention shown with the fingers in a rest position;

Figure 3 is a side elevational view showing the fingers bent inwardly so as to permit the passage of a limb of a tree, the fingers being urged towards the line holding means by the action of the resilient rod;

Figure 4 is a top plan view of the pole threader;

Figure 1:
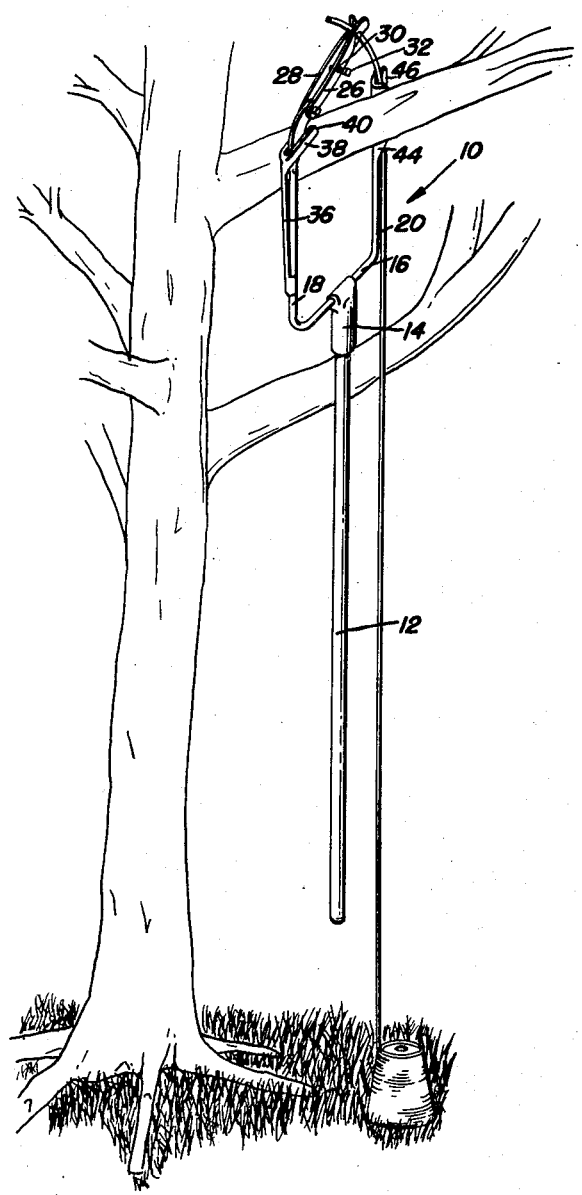
Figure 1 is a perspective view of the pole threader shown being used to pass a line over the limb of a tree.
Figure 5:
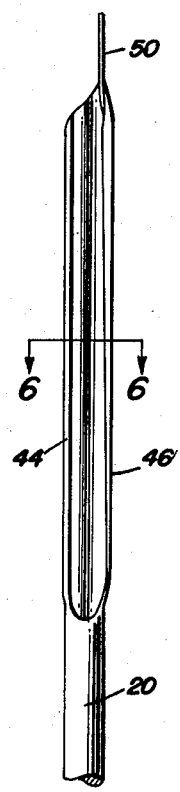
Figure 5 is an end elevational view showing in detail the construction of the line holding means comprising an important element of the pole threader.
Figure 6:
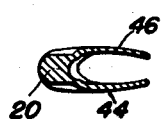
Figure 6 is a horizontal sectional detail as taken along the plane of line 6—6 in Figure 5.

With continuing reference to the accompanying drawings, wherein like reference numerals designate similar parts throughout the various views, reference numeral 10 is used to generally designate the pole threader comprising the present invention which includes a handle 12 which may either be made in one piece, or if desired, in telescoping sections. The handle 12 is secured to the other members of the invention by means of a tubular holder 14 to which the U-shaped member having a central connecting portion 16 and upwardly extending arms 18 and 20 is secured.

The upper end of the arm 18 is formed with an arcuate inwardly extending flattened portion 22. Pivotally connected at the end 22 by means of a suitable nut and bolt 24 are two fingers 26 and 28 which are urged into engagement with each other by means of the coil spring 30 about the headed pin 32. Brazed or welded as at 34 to the arm 18 is a resilient rod 36 which is formed with a bifurcated end portion 38 having cam surfaces 40 at its outermost end. The cam surfaces 40 are adapted to resiliently engage the fingers 26 and 28 and the resilient rod 36 will cause the fingers to ride upwardly from the position as is shown in Figure 3 to the position as is shown in Figure 2, when released after the limb of a tree has passed beneath the fingers. A recess 42 is formed in the finger 26 for a purpose to be henceforth explained.

The arm 20 is formed with line holding means including a pair of line guides 44 and 46 which are arcuate in shape. The line guide 44 terminates below the line guide 46. At the upper end of line guide 46 there are bifurcated portions 48 and 50 which substantially hold any line, such as twine or the like, in place so that such may be engaged by the fingers 26 and 28.

In operation, a piece of twine or other cord or line is threaded in the line holding means between the guides 44 and 46 and is threaded between the bifurcated portions 48 and 50. Then, the pole threader is raised until the limb presses down the fingers 26 and 28 as is shown in Figure 3. After the limb has passed below the lowermost extremity of the fingers then they are depressed, the resilient rod 36 will cause the cam surfaces 40 to engage the fingers 26 and 28 and press the fingers 26 and 28 upwardly. This returns the fingers to the position as is shown in Figure 2, preventing the downward travel of the pole threader unless the fingers 26 and 28 were to be moved upwardly. With the limb abutting against the fingers 26 and 28 the fingers will rise embracing the guides 44 and 46. Then, at the point where the guide 44 terminates, the fingers will take hold of the line in a firm and secure manner. The recess 42 is provided so as to insure that the fingers are permitted to engage the line contained within the bifurcation portions 48 and 50. This recess 42 is necessary due to the arcuate configuration of the guides 44 and 46.

Since from the foregoing the construction and advantages of this pole threader are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

What is claimed as new is as follows:

1. A threading device comprising a substantially U-shaped member having a pair of upwardly extending arms, a pair of opposed fingers pivotally secured to the first of said pair of arms, line holding means on the second of said pair of arms, and resilient means attached to said first arm urging said fingers upwardly, said resilient means including a rod having an angularly extending bifurcated upper end portion.

2. A threading device comprising a substantially U-shaped member having a pair of upwardly extending arms, a pair of opposed fingers pivotally secured to the first of said pair of arms, line holding means on the second of said pair of arms, and resilient means attached to said first arm urging said fingers upwardly, and spring means carried by said fingers urging said fingers against each other, said resilient means including a rod having an angularly extending bifurcated upper end portion.

3. A threading device comprising a substantially U-shaped member having a pair of upwardly extending arms, a pair of opposed fingers pivotally secured to the first of said pair of arms, line holding means on the second of said pair of arms, and resilient means attached to said first arm urging said fingers upwardly, and spring means carried by said fingers urging said fingers against each other, said resilient means including a rod having an angularly extending bifurcated upper end portion, said bifurcated upper end portion having cam surfaces, said cam surfaces engaging said fingers.

4. A threading device comprising a substantially U-shaped member having a pair of upwardly extending arms, a pair of opposed fingers pivotally secured to the first of said pair of arms, line holding means on the second of said pair of arms, and resilient means attached to said first arm urging said fingers upwardly, said line holding means including a pair of spaced line guides, the first of said pair of guides extending above the second of said pair of guides and having a bifurcated upper end, and a recess in one of said fingers permitting said fingers to engage said first guide.

5. A threading device comprising a substantially U-shaped member having a pair of upwardly extending arms, a pair of opposed fingers pivotally secured to the first of said pair of arms, line holding means on the second of said pair of arms, and resilient means attached to said first arm urging said fingers upwardly, and spring means carried by said fingers urging said fingers against each other, said line holding means including a pair of spaced line guides, the first of said pair of guides extending above the second of said pair of guides and having a bifurcated upper end, and a recess in one of said fingers permitting said fingers to engage said first guide.

6. A threading device comprising a substantially U-shaped member having a pair of upwardly extending arms, a pair of opposed fingers pivotally secured to the first of said pair of arms, line holding means on the second of said pair of arms, and resilient means attached to said first arm urging said fingers upwardly, and spring means carried by said fingers urging said fingers against each other, said line holding means including a pair of spaced line guides, the first of said pair of guides extending above the second of said pair of guides and having a bifurcated upper end, and a recess in one of said fingers permitting said fingers to engage said first guide, said resilient means including a rod having an angularly extending bifurcated upper end portion, said bifurcated upper end portion having cam surfaces, said cam surfaces engaging said fingers.

References Cited in the file of this patent
UNITED STATES PATENTS 1,830,208  Norling  Nov. 3, 1931